(12) United States Patent
Renault

(10) Patent No.: US 6,649,109 B1
(45) Date of Patent: Nov. 18, 2003

(54) METHOD FOR MOLDING AN IMPACT RESISTANT AUTOMOTIVE PART

(75) Inventor: Thierry Renault, Vernon (FR)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/451,970

(22) Filed: Nov. 30, 1999

(51) Int. Cl.$^7$ .......................... B29C 43/20; B29C 43/52
(52) U.S. Cl. ..................... 264/258; 264/322; 264/324; 264/325; 293/120
(58) Field of Search ................. 264/258, 322, 264/324, 325; 293/102–155

(56) References Cited

U.S. PATENT DOCUMENTS

| | | | |
|---|---|---|---|
| 4,304,751 A | * 12/1981 | Li et al. ...................... | 264/322 |
| 4,590,027 A | * 5/1986 | Murphy et al. .............. | 264/135 |
| 4,749,613 A | * 6/1988 | Yamada et al. ............. | 428/286 |
| 4,913,774 A | * 4/1990 | Goguelin .................... | 161/258 |
| 5,269,574 A | * 12/1993 | Bhutani et al. ............. | 293/102 |
| 5,294,394 A | * 3/1994 | Sakai et al. ................. | 264/135 |
| 5,441,590 A | * 8/1995 | Ihm et al. ................... | 156/148 |
| 5,753,062 A | * 5/1998 | Jansz et al. ................. | 156/148 |
| 5,927,778 A | * 7/1999 | Uytterhaeghe et al. ..... | 293/120 |
| 6,286,879 B1 | * 9/2001 | Haque et al. ............... | 293/120 |

FOREIGN PATENT DOCUMENTS

| | | |
|---|---|---|
| EP | 99400421.6 | 2/1999 |
| EP | 0 937 611 A1 | 8/1999 |
| FR | 2 749 535 | 6/1996 |

* cited by examiner

*Primary Examiner*—Stefan Staicovici
(74) *Attorney, Agent, or Firm*—Brooks Kushman

(57) ABSTRACT

A molding method and an impact resistant automotive part such as a bumper beam resulting from the molding method are obtained wherein a thermoplastic reinforced fiber structure at least partially forms a pair of attachment portions of the part and continuously extends between the attachment portions to link the attachment portions. The method includes the steps of providing a plurality of blanks, heating the plurality of blanks, and stacking the plurality of blanks to form a stack of blanks. The stack is then stamped to form the part including the pair of attachment portions spaced a predetermined distance apart. The thermoplastic reinforced fiber structure has tows of fibers wetted by a resin material such as polypropylene. Preferably, the fibers are woven glass fibers.

14 Claims, 3 Drawing Sheets

METHOD FOR MOLDING AN IMPACT RESISTANT AUTOMOTIVE PART

TECHNICAL FIELD

This invention relates to methods for molding and impact resistant automotive parts such as bumper beams produced thereby.

BACKGROUND ART

There is a need for automotive parts which are impact resistant by remaining in one piece after high speed impact. Such an automotive part is a bumper beam.

There are numerous requirements for automotive bumper beams both in North America and Europe. These requirements differ depending on whether there are for low speed impacts, high speed impacts, insurance requirements, etc.

For example, for low speed impacts the following are detailed requirements:

US Federal regulations REG 581: bumper standard. 5 impacts are required:
  2 longitudinal pendulum impacts at 2.5 mph (at two heights between 16 and 20 inches);
  2 corner pendulum impact (one on each corner) at 1.5 mph; and
  1 longitudinal barrier at 2.5 mph.
After the 5 impacts, the requirements on the vehicle are shown in 581.5 c of the regulation.

Canada Safety Standards: Bumper passenger car CMVSS 215. 4 impacts are required:
  2 longitudinal pendulum impacts at 5 mph (at two heights between 16 and 20 inches;
  1 corner pendulum impact (one on each corner) at 3 mph; and
  1 longitudinal barrier at 5 mph.
After 4 impacts, the requirements are the same as FED REG 581 with the important exception of requirement of FED REG 581.5c8 (no separation of polymeric coatings and permanent deviations except on bumper).

European Requirements (ECE 42). Pendulum impact at 4 km/h. Consequently, for low speed impacts, the beam must absorb energy by elastic deformation (deflection). Its rigidity is tuned to limit the deflection to the vehicle requirements.

For insurance purposes, the following are detailed requirements.

Europe: Danner
Impact at 15 km/h against a wall with 40% overlap. The goal is to reduce repair costs by limiting the degradation to the bumper. Absorbers are added between the bumper beam and the rails to protect the rails during impact. For Danner requirements, the beam+ absorber must be crushed progressively to absorb the impact energy and protect the rails.

US Requirements IIHS: Four 5 mph Crash Tests to Assess Bumper Performance
  Front into flat barrier
  Front into angle barrier
  Rear into flat barrier
  Rear into pole (7 inch diameter)

For high speed impact, the following are detailed requirements.

US Requirements: FMVSS n°208
Full frontal crash against a perpendicular rigid barrier at 30 mph with unrestrained and belt restrained 50th percentile Hybrid III male dummy. The injury criteria include threshold criteria for the head, chest deceleration, chest deflection, and femur lower leg.

European: EU Directive 96/79 EC
  Impact speed is 56 kph (35 mph);
  Impact object is fixed deformable barrier;
  Vehicle frontal overlap with barrier: 40% overlap of the vehicle width directly in line with the barrier face;
  Dummy type: belt restrained, 50th percentile Hybrid III male;
  Injury criteria: same threshold criteria and in addition, viscous criteria, the neck, the knee, lower leg bending (tibia index), foot/ankle, compression, and compartmental intrusion.

Consequently, for high speed impact it is important that the bumper beam distributes the load and is still in one piece attached to the rails after impact.

Other requirements are:
Pedestrian Impact: Lower leg impact at 40 kph. Three criteria are used: tibia deceleration should be less than 150 g, knee bending angle should be less than 15° and knee shear displacement should be less than 6 mm.

Airbag Deployment: The beam should be stiff enough to trigger the airbag at 30 kph.

French Patent No. 2,749,535 discloses a process to manufacture a part in which glass fibers are adequately wetted by thermoplastic material so that parts can be molded with a better strength, stiffness and impact resistance than GMT (Glass mat thermoplastics) parts, such as bumper beams, for a given weight.

French and European patent application 99400421.6 discloses a bumper beam designed for small parking impacts (4 km/h), insurance requirements (Danner impact at 15 km/h), low weight (as compared with metallic solutions) and reduced cost. The beam is made of a profile that contains at least one polymeric material in which the profile has "cones" in the direction of the vehicle to attach the beam to the car.

Referring now to FIGS. 1–3, there is schematically illustrated a process for molding a bumper beam, generally indicated at 10 (FIG. 3), in accordance with the above-noted French Patent No. 2,749,535. As illustrated in FIG. 1, to mold the beam 10 six blanks are provided (FIG. 1): two blanks 12 of EMIR (that contain Twintex, manufactured by Vetrotex France. Twintex includes woven mats made of tows that contain both glass and polypropylene fibers); and four blanks 14 of GMT. The EMIR blanks 12 include outer layers of Twintex. The inner layers of EMIR may include a central glass mat layer sandwiched between polypropylene layers.

Preferably, the EMIR blanks 12 are made on a double belt press starting with 7 layers of materials. From top to bottom: Twintex (woven 4/1, 60 wt % glass, 920 g/m2), PP film, glass mats, extruded PP layer, glass mats, PP film and Twintex. The GMT in the center (i.e., the layers other than the Twintex layers) contains 30 wt % glass. The resulting EMIR blank 12 that is obtained contains 42 wt % glass and is 5 mm thick. The tows of glass fibers,are in contact (comingled) with thermoplastic material, where the fibers in each tow are wetted by the thermoplastic material in the tow. The dimensions of the EMIR blanks 12 are 1000 mm×125 mm. The blanks 14 of GMT contain 30 wt % glass and their dimensions are 166×360 mm. Their thickness is 3.7 mm.

The six blanks are heated in an oven. A robot stacks two blanks 14 of GMT, two blanks 12 of EMIR and two blanks 14 of GMT. The two stacks of GMT are put on top of the EMIR stack (on each side) with 30% overlap as shown in FIG. 2.

The assembly is transferred into a press or mold and stamped to form the bumper beam 10 illustrated in FIG. 3.

The welding between the GMT blanks 14 and the EMIR blanks 12 is adequate. The GMT at the center of the EMIR blanks 12 flows to fill attachment portions 16 of the bumper beam 10. A central portion 19 of the beam 10 includes the resulting thermoplastic reinforced fiber structure 18. The attachment portions 16 include apertures 20 formed through cone portions (as illustrated in French and European patent application 99400421.6) for attachment of the bumper beam 10 to an automotive vehicle.

The resulting bumper beam 10, while satisfying parking and insurance requirements, does not satisfy high speed requirements because the cone portions by which the beam 10 is attached to rails of a vehicle are made of GMT and cannot survive such impact.

Consequently, it is desirable to have a bumper beam that can:

absorb low speed impact by elastic deflection;

absorb Danner impact (if required) by progressive crush of molded-in cone absorbers; and insure a link between rails and load distribution during a high speed crash.

DISCLOSURE OF INVENTION

An object of the present invention is to provide a method for molding and an impact resistant automotive part such as a bumper beam produced thereby wherein the resulting bumper beam addresses both U.S. and European requirements (including high speed requirements) for bumper beams.

Another object of the present invention is to provide a method for molding and an impact resistant automotive part such as a bumper beam produced thereby wherein the bumper beam contributes to energy absorption during high speed impacts. During high speed impact, it is important that the beam remains in one piece and attached to the rails in order to distribute the impact load on a maximum area.

In carrying out the above objects and other objects of the present invention, a method is provided for molding an impact resistant automotive part adapted to be attached to an automotive vehicle at a pair of attachment locations spaced a predetermined distance apart. The method includes providing a plurality of blanks of material including at least one layer having tows of fibers, heating the plurality of blanks, and stacking the plurality of blanks to form a stack of blanks. The method further includes stamping the stack to form the automotive part having a pair of attachment portions spaced the predetermined distance apart. The tows of fibers are wetted by a resin material to form at least one thermoplastic reinforced fiber structure. The at least one thermoplastic reinforced fiber structure at least partially forms the pair of attachment portions and continuously extends between the attachment portions to link the attachment portions.

Preferably, the resin is polypropylene.

Also, preferably, the tows are woven.

The attachment portions have inner and outer surfaces and wherein two thermoplastic reinforced fiber structures at least partially form the attachment portions at the inner and outer surfaces.

Each of the two thermoplastic reinforced fiber structures may be formed from a single-layer blank.

Alternatively, each of the two thermoplastic reinforced fiber structures is formed from a multi-layer blank.

The tows may be aligned to improve part stiffness or may be unidirectional, wherein the unidirectional tows are attached together to preserve tow alignment during molding.

The woven fibers may be unbalanced.

Preferably, each of the attachment portions is cone-shaped.

The plurality of blanks typically include a plurality of blanks of glass mat thermoplastics where at least one of the blanks includes a glass mat layer and at least one layer of thermoplastic material.

The fibers are typically glass fibers.

Further in carrying out the above objects and other objects of the present invention, an impact resistant automotive part molded from a plurality of blanks is provided. The automotive part is adapted to be attached to an automotive vehicle at a pair of attachment locations spaced a predetermined distance apart. The automotive part includes a central shock-absorbing portion and a pair of attachment portions connected to the central shock-absorbing portion and spaced the predetermined distance apart. The automotive part also includes at least one thermoplastic reinforced fiber structure which at least partially forms the central shock-absorbing portion and the pair of attachment portions and continuously extends between the attachment portions to link the attachment portions.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 4:
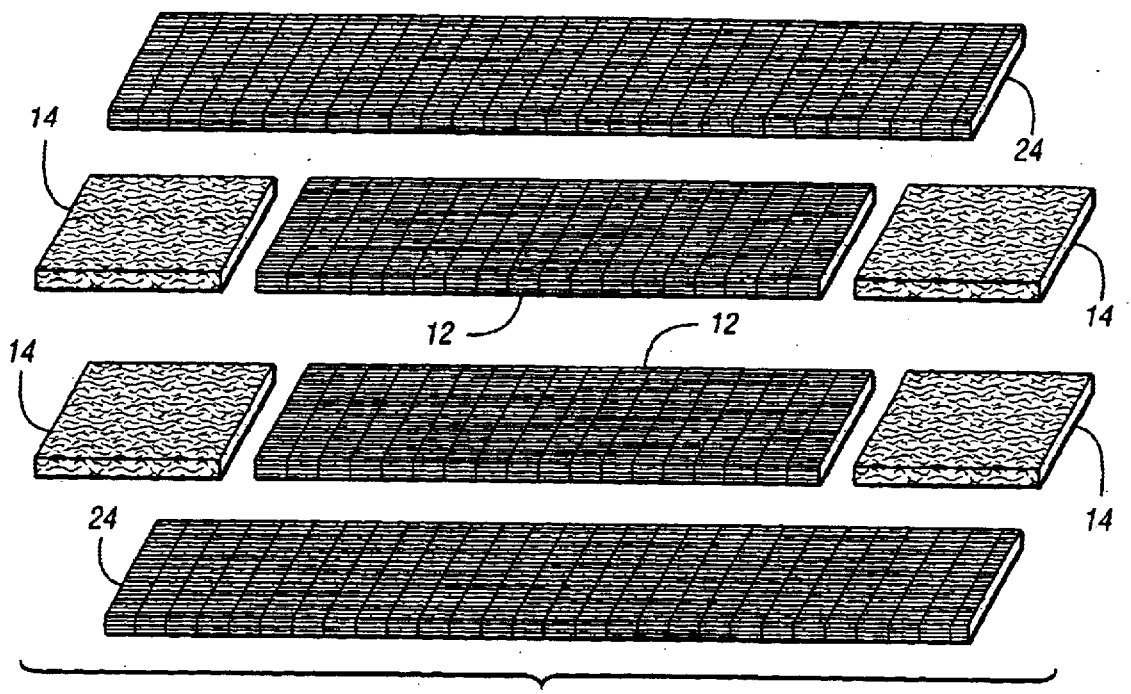
FIG. 4 is a schematic view of a plurality of blanks for use in a first embodiment of a method in accordance with the present invention and including two layers of woven mats made of tows that contain both glass and polypropylene fibers.
Figure 5:
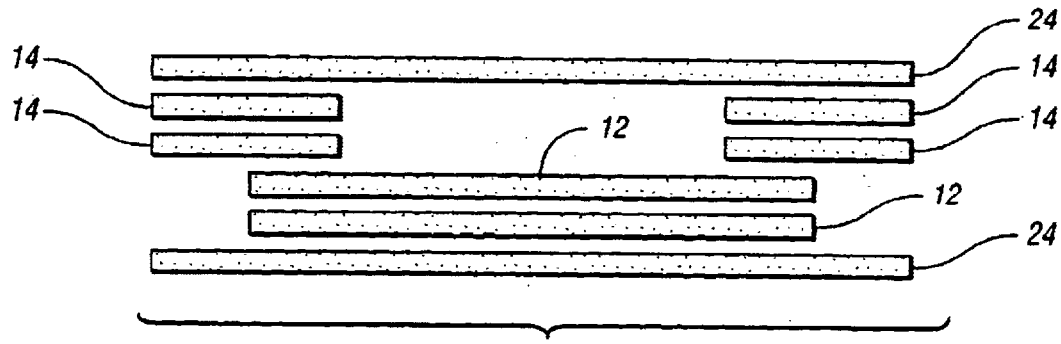
FIG. 5 is a schematic view of a stack of the blanks of FIG. 4 disposed in a mold.
Figure 6:
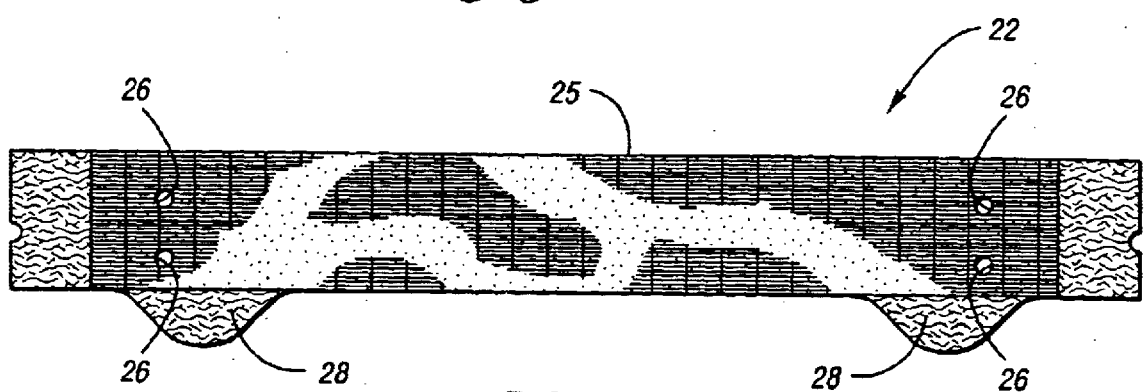
FIG. 6 is a schematic view of a bumper beam made in accordance with the first embodiment of the method of the present invention.

Referring now to FIGS. 4–6, there is illustrated a first embodiment of the invention. In FIG. 6, there is illustrated an impact resistant automotive part such as a bumper beam, generally indicated at 22, made by the process of the invention. The blanks utilized in this process include blanks 12 and 14 from the prior art process of FIG. 1 together with Twintex layers or blanks 24 (i.e., FIG. 4). However, it is to be understood that the automotive part could be an impact resistant automotive part such as a front end carrier (bolster) to improve crash resistance of the part, a lifgate structural part where the Twintex is used to link the hinges to the lock, or any other automotive part where the part must be in one piece after high speed impact.

The blanks 12, 14 and 24 are heated in an oven to melt the polypropylene in the blanks 12, 14 and 24 (i.e., between 160°–200° C.) and then the hot blanks 12, 14 and 24 are stacked to obtain the stack of FIG. 5. The stack of heated blanks 12, 14 and 24 are then pressed or stamped at a pressure between 10–30 bars in a mold to form the bumper beam 22.

The Twintex layers 24 are preferably 4/1, 2000 g/m2 and have dimensions of 1500×183 mm. Each of the Twintex layers 24 forms a thermoplastic reinforced fiber structure 25 in the bumper beam 22 at front and back surfaces thereof and is long enough to link fixation points or holes 26 formed in cone-shaped end portions 28 for attachment to the rails (not shown) of a vehicle. The holes 26 may be formed by placing the bumper beam 22 in a mold cavity with punch pins extending into a mold cavity from one or more mold halves when the mold is closed.

The beam 22 reinforced with Twintex was tested at 65 km/h with the same conditions as previously described with reference to FIGS. 1–3. The beam 22 after impact was still in one piece and attached to the rails of the vehicle.

Figure 1:
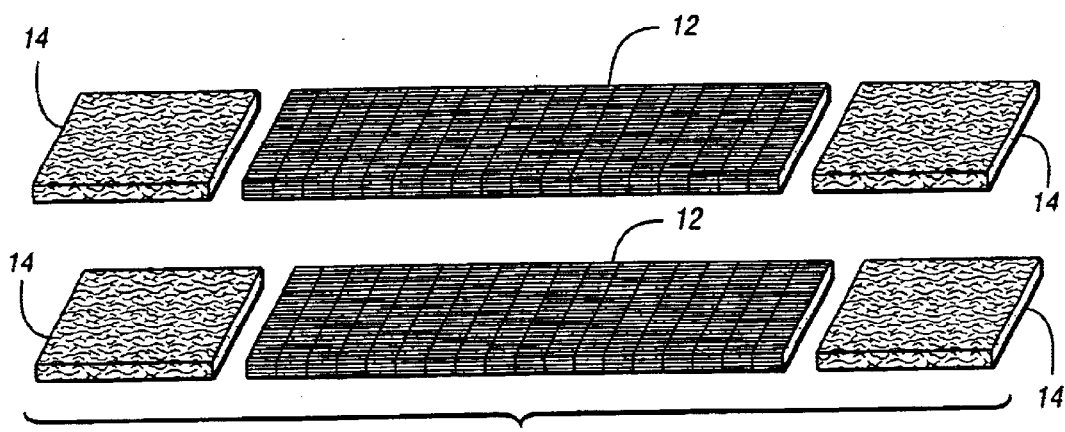
FIG. 1 is a schematic diagram illustrating various blanks of material for use in a prior art process for making an impact resistant automotive part such as a bumper beam.
Figure 2:
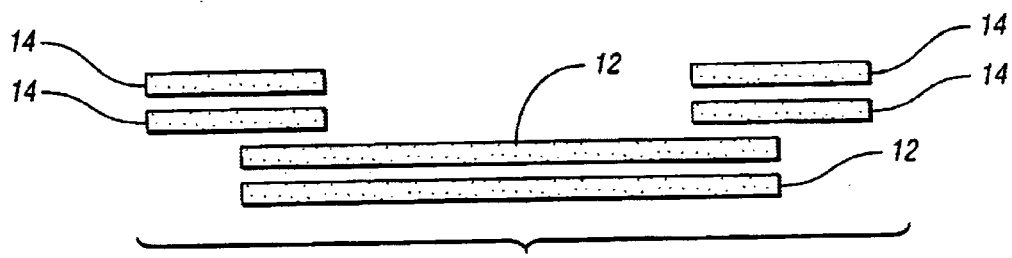
FIG. 2 is a schematic view of a stack of such blanks disposed in a mold.
Figure 3:
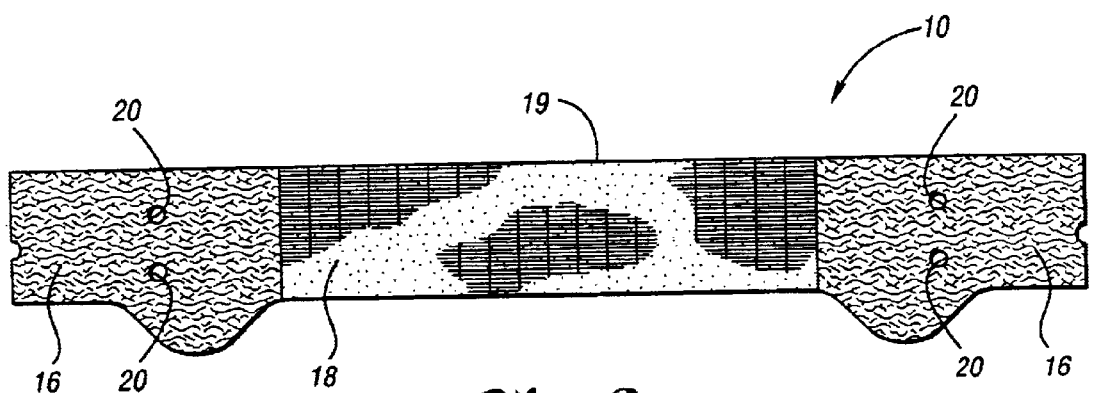
FIG. 3 is a schematic view of a bumper beam made according to the prior art method.

The improvement over the prior art method and bumper beam 10 of FIGS. 1–3 is the one or more continuous thermoplastic, reinforced glass fiber structures 25 between and including the holes 26 formed through attachment portions 28 of the beam 22.

The fibers are preferably woven glass fibers. This allows the beam 22 to withstand high speed impact. With this embodiment, it is still possible to have cones to attach the beam 22 (if necessary) and to use these cones for Danner requirements.

Figure 7:
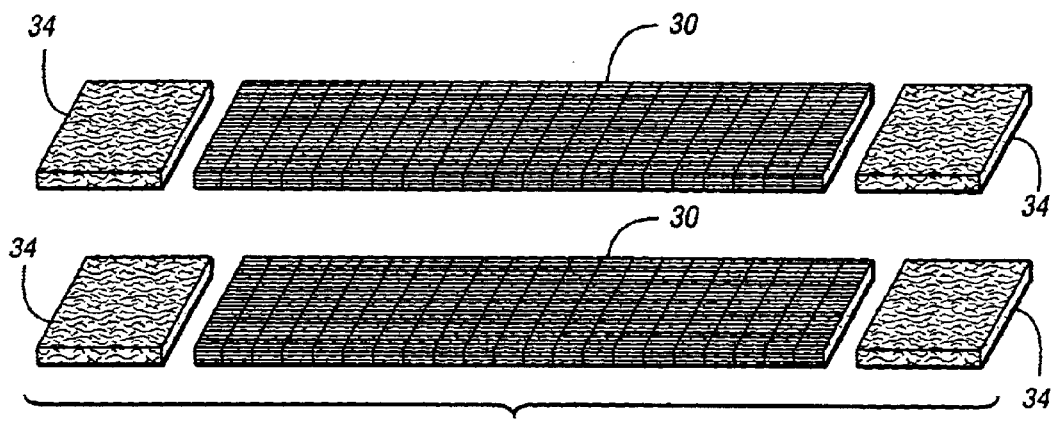
FIG. 7 is a schematic view of blanks for use in a second embodiment of the method of the present invention.
Figure 8:
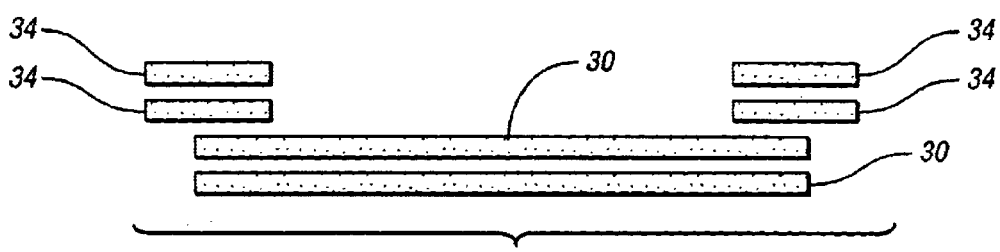
FIG. 8 is a schematic view of a stack of the blanks of FIG. 7. disposed in a mold.
Figure 9:
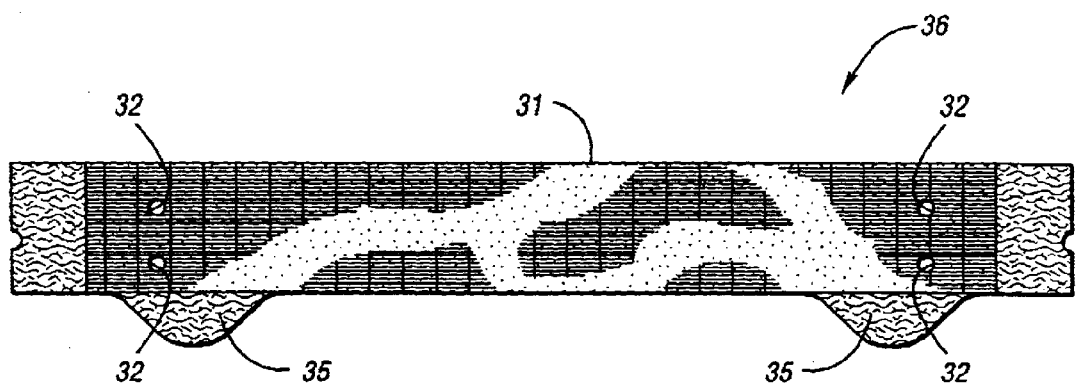
FIG. 9 is a schematic view of a bumper beam manufactured in accordance with the second embodiment of the present invention.

Referring now to FIGS. 7–9, there is illustrated another embodiment of the invention wherein it is also possible to use a stack (FIG. 8) similar to the stack illustrated in FIG. 2, but with longer EMIR blanks 30 so that the woven fibers of the resulting thermoplastic reinforced fiber structure 31 link holes 32 formed in attachment portions 35 of a beam 36. The holes 32 of the second embodiment may be formed in the same fashion as the holes 26 of the first embodiment. For example, two EMIR blanks 30 1500×150 and four blanks 34 of GMT with reduced dimensions are provided (FIG. 7). The blanks 30 and 34 are heated and then stacked as in the embodiment of the prior art and in the first embodiment of the invention.

For US parking requirements, the beams 22 and 36 may be thicker by using four layers or blanks of EMIR or a mixture of blanks of EMIR and GMT.

In a preferred mode of the present invention, the fiber tows are aligned to improve the beam stiffness. Also, the tows can be woven to preserve fiber orientation during molding. It is also possible to have unidirectional tows that are attached together with a polyester thread to preserve the alignment during molding. Other types of weave can be used such as balanced or unbalanced (for example, 4/1) where four times more fibers are in the longitudinal directions than in the transverse direction.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for molding an impact resistant automotive part adapted to be attached to an automotive vehicle at a pair of attachment locations spaced a predetermined distance apart, the method comprising the steps of:

providing a plurality of blanks of material including at least one layer having tows of fibers comingled with thermoplastic resin material;

heating the plurality of blanks;

stacking the plurality of blanks to form a stack of blanks;

stamping the stack of blanks to form an automotive part having a pair of attachment portions spaced the predetermined distance apart wherein the tows of fibers are being wetted by the thermoplastic resin material to form a thermoplastic reinforced fiber structure which at least partially forms a central shock-absorbing portion and the pair of attachment portions, wherein the central shock-absorbing portion continuously extends between the attachment portions; and providing fixation points or holes in the attachment portions, where the fixation points or holes are located within the thermoplastic reinforced fiber structure and two thermoplastic reinforced fiber structures at least partially form the attachment portions.

2. The method as claimed in claim 1 wherein the resin material is polypropylene.

3. The method as claimed in claim 1 wherein the tows are woven.

4. The method as claimed In claim 1 wherein each of the two thermoplastic reinforced fiber structures is formed from a single-layer blank.

5. The method as claimed in claim 1 wherein each of the two thermoplastic reinforced fiber structures is formed from a multi-layer blank.

6. The method as claimed in claim 1 wherein the tows are aligned to improve part stiffness.

7. The method as claimed in claim 1 wherein the tows are unidirectional and wherein the unidirectional tows are attached together to preserve tow alignment during molding.

8. The method as claimed in claim 3 wherein the woven fibers are unbalanced.

9. The method as claimed in claim 1 wherein each of the attachment portions is cone-shaped.

10. The method as claimed in claim 1 wherein the plurality of blanks include a plurality of blanks of glass mat thermoplastics.

11. The method as claimed in claim 1 wherein at least one of the blanks includes a glass mat layer and at least one layer of thermoplastic material.

12. The method as claimed in claim 1 wherein the fibers are glass fibers.

13. A method for molding an impact resistant automotive part adapted to be attached to an automotive vehicle at a pair of attachment locations spaced a predetermined distance apart, the method comprising the steps of:

providing a plurality of blanks of material including at least two layers having tows of fibers comingled with thermoplastic resin material;

heating the plurality of blanks;

stacking the plurality of blanks to form a stack of blanks, wherein the at least two layers having tows of fibers are positioned to form front and back surfaces of the stack of blanks;

stamping the stack of blanks to form an automotive part having a pair of attachment portions spaced the predetermined distance apart wherein the tows of fibers are being wetted by the thermoplastic material to form a thermoplastic reinforced fiber structure which at least partially forms a central shock-absorbing portion and the pair of attachment portions, wherein the central shock-absorbing portion continuously extends between the attachment portions; and providing fixation points or holes in the attachment portions, where the fixation points or holes are located within the thermoplastic reinforced fiber structure and two thermoplastic reinforced fiber structures at least partially form the attachment portions.

14. A method for molding an impact resistant automotive part adapted to be attached to an automotive vehicle at a pair of attachment locations spaced a predetermined distance apart, the method comprising the steps of:

providing a plurality of blanks of material including at least two layers having tows of fibers comingled with thermoplastic resin material;

heating the plurality of blanks;

stacking the plurality of blanks to form a stack of blanks, wherein the at least two layers having tows of fibers are positioned adjacently to form front or back surfaces of the stack of blanks;

stamping the stack of blanks to form an automotive part having a pair of attachment portions spaced the predetermined distance apart wherein the tows of fibers are being wetted by the thermoplastic resin material to form a thermoplastic reinforced fiber structure which at least partially forms a central shock-absorbing portion and the pair of attachment portions, wherein the central shock-absorbing portion continuously extends between the attachment portions; and providing fixation points or holes in the attachment portions, where the fixation points or holes are located within the thermoplastic reinforced fiber structure and two thermoplastic reinforced fiber structures at least partially form the attachment portions.

* * * * *